Nov. 14, 1950 L. D. STATHAM 2,530,184
STRAIN MEASURING INSTRUMENT
Filed Jan. 19, 1944 2 Sheets-Sheet 1

FIG. I

INVENTOR.
LOUIS D. STATHAM
BY
ATTORNEY

Nov. 14, 1950     L. D. STATHAM     2,530,184
STRAIN MEASURING INSTRUMENT

Filed Jan. 19, 1944     2 Sheets-Sheet 2

*INVENTOR.*
LOUIS D. STATHAM
BY
*ATTORNEY*

Patented Nov. 14, 1950

2,530,184

UNITED STATES PATENT OFFICE 2,530,184

STRAIN MEASURING INSTRUMENT

Louis D. Statham, Beverly Hills, Calif., assignor to Curtiss-Wright Corporation, a corporation of Delaware Application January 19, 1944, Serial No. 519,067

8 Claims. (Cl. 73—88.5)

This invention relates to mechanism for electrically measuring and indicating quantities which can be caused to actuate slight variations in electrical resistance. It is particularly applicable to the measurement and indication of structural strains, such as in aircraft, ships, land vehicles, bridges, highways, subways, towers, pressure vessels and tanks, dams, cranes and hoists, machinery, and ordnance, by means of resistance-type strain gages.

According to one embodiment of the present invention, a plurality of strain gages, or other resistance-type electrical measuring instruments, are incorporated in a plurality of Wheatstone bridges. The current outputs from these bridges are selectively measured and indicated, by means of mechanism hereinafter described, on a galvanometer or other device for indicating electric currents. An overload relay, as described hereinafter, and other protective devices are incorporated in the system for the purpose of preventing excessive current loads on the galvanometer.

Figure 1:
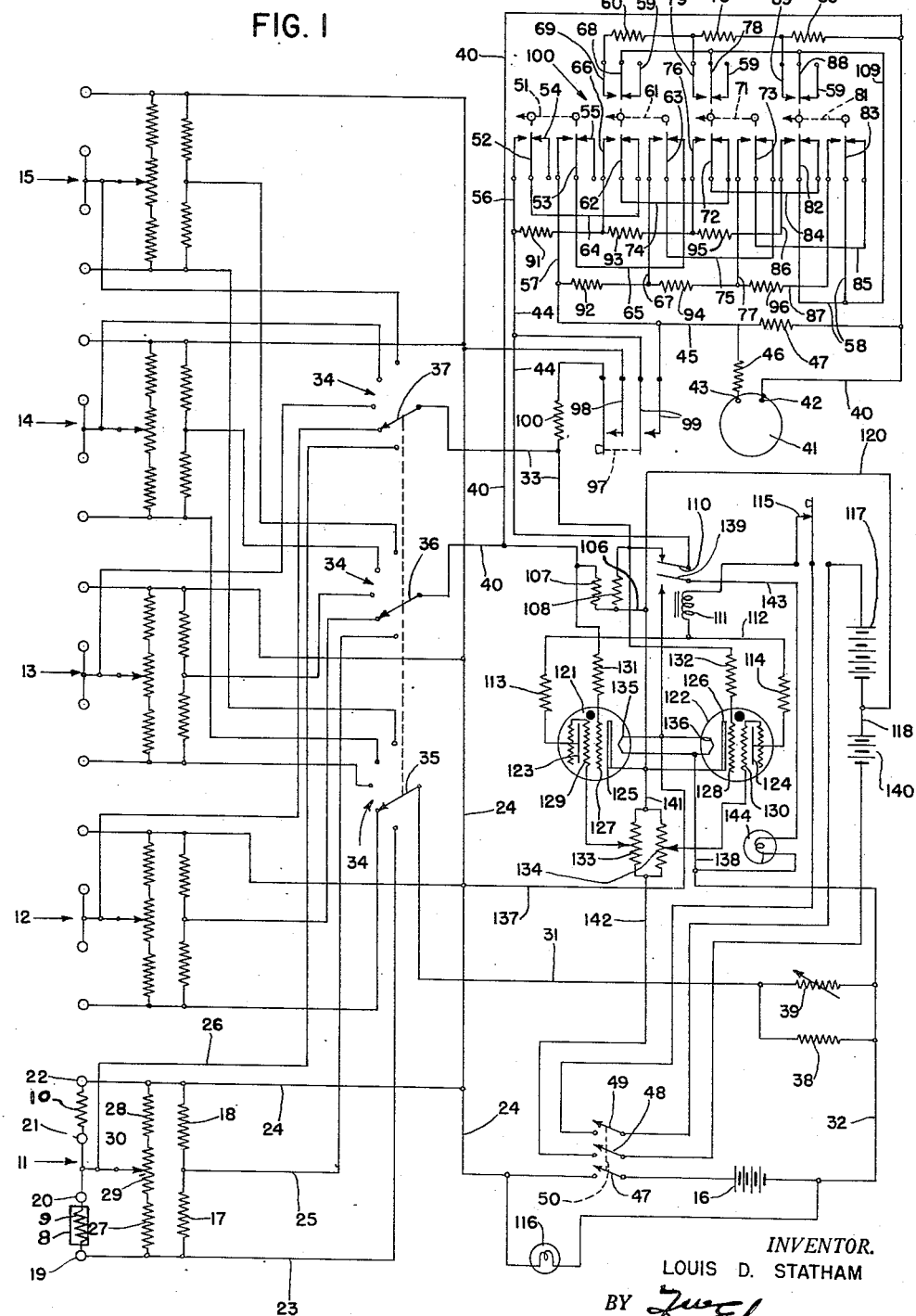
Figure 2:
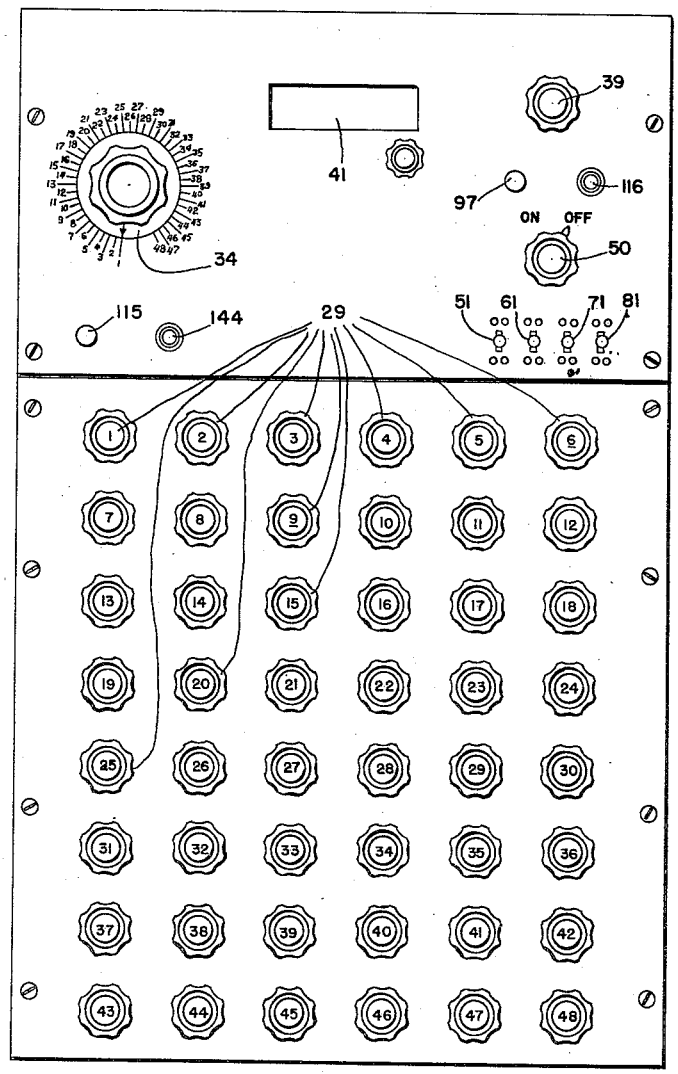
Figure 3:
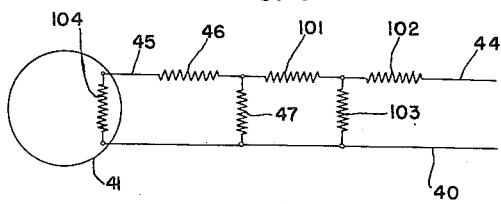

This system and its operation may be best understood by reference to the accompanying drawings, in which:

Figure 1 is a wiring diagram and arrangement of an embodiment of this invention, containing five strain gage circuits; Figure 2 is a front view of an instrument case and panel for use with the circuits shown in Figure 1, but in which 48 strain gage circuits are incorporated; and Figure 3 is a simplified wiring diagram of a portion of the mechanism shown in Figure 1.

Referring now to Figure 1, five Wheatstone bridge circuits are indicated generally at 11, 12, 13, 14, and 15, respectively. The bridge circuit indicated at 11 is representative of the others and will be described in detail. It consists of two fixed resistances 17 and 18, of 120 ohms each, wired in series, constituting two arms of the bridge. The remaining two arms are composed of two strain gages or other resistance-type measuring instruments, also of approximately 120 ohms each resistance. One of these gages 9, known as the working gage, is connected across the terminals 19 and 20, and the other gage 10, known as the compensating (or "control") gage, is connected across the terminals 21 and 22. The gage 9 may, for example, be bonded to an element 8 which may be subjected to various stresses with accompanying strain of the gage 9. The input battery is connected through the leads 23 and 24, respectively, as hereinafter described. The galvanometer is connected through leads 25 and 26, also as hereinafter described. Also incorporated in the bridge are two channel balancing arms shunted across the terminals 19 and 20 of the working gage and 21 and 22 of the compensating gage, respectively. These channel balancing arms are composed of two fixed resistances 27 and 28 of 10,000 ohms each and a potentiometer-connected rheostat or potential divider 29 of 20,000 ohms resistance. The variable contact arm 30 of the potentiometer 29 is connected to the terminals 20 and 21, so that movement of the contact arm 30 increases the resistance shunting one of the gages and decreases the resistance shunting the other. By this means it is possible to compensate for a different of resistance of almost 1 ohm between the working and compensating gages.

Terminal 22 and resistance 18 are both connected through lead 24 and the lower deck 47 of a 3-deck main switch 50 to the positive terminal of a 6-volt battery 16. Terminal 19 and resistance 17 are likewise both connected through lead 23 and lower deck 35 of a 3-deck channel selector switch 34 (the other two decks of which are indicated at 36 and 37), circuit 31, parallel resistances 38 and 39, and circuit 32 to the negative terminal of the 6-volt battery 16.

Resistance 38 is a fixed resistance of 35 ohms, while resistance 39 is a variable resistance or rheostat of 50 ohms. Operation of the rheostat 39 varies the voltage applied to the bridge and thus the current output per ohm of bridge unbalance. As strain gages are manufactured of various materials, the amount of strain (in inches per inch) necessary to secure a certain variation in resistance varies with the nature of the material, according to the following formula:

$$\Delta R = kRS \tag{1}$$

where $\Delta R$ is the change in resistance (in ohms) of the strain gage, $k$ is a constant for the particular material out of which the strain gage is made, $R$ is the resistance (in ohms) of the strain gage at zero strain, and $S$ is the applied strain in inches per inch. From the laws applicable to the Wheatstone bridge (assuming small values of $\Delta R$ compared to $R$ and assuming that the resistances of the four arms of the bridge in the balanced condition are approximately equal) the following approximate equation can be derived:

$$A = \frac{E \Delta R}{4(R+G)(R+B)} \tag{2}$$

where $A$ is the current in amperes flowing through the galvanometer circuit, $E$ is the electromotive force in volts of the battery 16, $G$ is the resistance in ohms of the galvanometer circuit, and B is the resistance in ohms of the battery circuit. Transposing:

$$\Delta R = \frac{4A}{E}(R+G)(R+B) \qquad (3)$$

and substituting from (1) and dividing by $AkR$:

$$\frac{S}{A} = \frac{4(R+G)(R+B)}{EkR}, \qquad (4)$$

or $$\frac{S}{C} = \frac{4(R+G)(R+B)}{EkFR}, \qquad (5)$$

where C is the current in amperes flowing through the galvanometer itself and F is the ratio of C to A, or the ratio of the current flowing through the galvanometer itself to the current flowing through the galvanometer circuit. Assuming that E, F, R, and G are constant, then the following relation holds:

$$\frac{S}{C} \propto \frac{R+B}{kR} \qquad (6)$$

Since it is desirable (for ease and simplicity in reading the galvanometer scale) all the value $$\frac{S}{C}$$

be a constant, or an integral multiple thereof, for all types of strain gages used, it is easily seen that this can be readily accomplished by suitable adjustment of B for varying values of $k$. The constant $k$ is known as the gage factor, and ordinarily varies between 2.0 and 2.15 for commercial strain gages now on the market. The rheostat 39 and the fixed resistance 38, by varying the resistance, thus acts as an adjusting means or "gage factor control," for securing a constant value of $$\frac{S}{C}$$

The junction between resistances 17 and 18 is connected through circuit 25 and the middle deck 36 of the channel selector switch 34 to circuit 40, the latter in turn connecting directly to one terminal 42 of the galvanometer 41. Terminals 20 and 21 are connected through circuit 26, the upper deck 37 of the channel selector switch and circuit 33 to a relay switch 110 (as hereinafter described in greater detail). The opposite pole of the relay switch 110 is connected to a circuit 44 which is in turn connected, through the multiplying switch system as described herein, and circuit 45, to the second terminal 43 of the galvanometer 41. The galvanometer contains an internal resistance of 53 ohms, and circuit 45 is in series with an external resistance 46 of 190 ohms. An external shunt resistance 47 of 165.5 ohms is connected across circuits 40 and 45.

The multiplying switch system is indicated generally at 100. This enables low strain values to be read with accuracy on a galvanometer scale of limited range, and at the same time permits the reading of higher strain values outside this range, by reducing the current (equivalent to a given strain) sent through the galvanometer to a fixed fraction (such as one-half, one-fifth, or one-tenth) of its normal value. Stated in another way, the ratio of strain to current flowing through the galvanometer (S/C) is increased by a certain integral multiplying factor (e. g., 2, 5, or 10). With a multiplying factor of 5, for example, a gage reading of 120 micro-inches per inch would indicate an actual strain of 600 micro-inches per inch. From Equation 5, assuming E, $k$, R, and B are constant, the following relation holds:

$$\frac{S}{C} \propto \frac{R+G}{F} \qquad (7)$$

From Equation 7, the ratio $$\frac{S}{C}$$

can be increased by decreasing the value of F. For best results, the value of G (the total resistance of the galvanometer circuit) should be approximately the same whatever the multiplying factor used. By this is meant that the highest effective value of G should preferably not exceed the lowest effective value of G by more than about 50 per cent. By this means, accurate measurement and proper control is greatly facilitated.

The multiplying switch system comprises a plurality of momentary contact switches, one for the normal range and one for each multiplying factor. In the form shown in the drawings there are four of these switches, indicated at 51, 61, 71, and 81, these being respectively for the normal range (or multiplying factor of 1), for a multiplying factor of 2, for a multiplying factor of 5, and for a multiplying factor of 10. These switches are so arranged, as hereinafter described, that actuation of two or more switches will cause only the one with the highest multiplying factor to be operative. Each switch is composed of at least two jointly operated movable contact arms 52, 62, 72, and 82, respectively, and 53, 63, 73, and 83, respectively. In Figure 1, each switch is shown in its lower or inoperative position, contact arm 52 being in contact with circuit 54, arm 53 with circuit 55, arm 62 with circuit 64, arm 63 with circuit 65, arm 72 with circuit 74, arm 73 with circuit 75, arm 82 with circuit 84, and arm 83 with circuit 85. Circuits 54 and 55 are open or dead-end, but circuits 64, 65, 74, 75, 84, and 85 are each connected to the corresponding contact arm of the switch having the next lower multiplying factor. Thus circuit 64 is connected with contact arm 52, 65 with 53, 74 with 62, 75 with 63, 84 with 72, and 85 with 73. The contact arms 82 and 83 of switch 81 are connected to each other by means of circuit 58.

Each switch 51, 61, 71, and 81 also has an upper or operative position. In these positions contact arm 52 is in contact with circuit 56, arm 53 with circuit 57, arm 62 with circuit 66, arm 63 with circuit 67, arm 72 with circuit 76, arm 73 with circuit 77, arm 82 with circuit 86, and arm 83 with circuit 87.

Circuit 56 is connected directly to circuit 44 and circuit 57 directly to circuit 45. Thus it is seen that actuation of switch 51 will cause the current to flow through circuit 44, circuit 56, arm 52, circuit 64, arm 62, circuit 74, arm 72, circuit 84, arm 82, circuit 58, arm 83, circuit 85, arm 73, circuit 75, arm 63, circuit 65, arm 53, circuit 57, and circuit 45. In this position, the resistance of the galvanometer circuit (shown in Figure 3) is merely the combination of the galvanometer internal resistance (53 ohms), the external series resistance 46 (190 ohms), and the external shunt resistance 47 (165.5 ohms). Thus, in Figure 3, resistances 101 and 102 are each zero and resistance 103 is infinity. It will be observed that, when switch 51 is closed, the circuit is broken if any of the remaining switches 61, 71, or 81 are in the upper or operative position.

In addition to the contact arms 62, 63, 72, 73, 82, and 83, switches 61, 71, and 81 each have a third contact arm 68, 78, and 88, respectively, jointly operated with the other two. These contact arms 68, 78, and 88 in their lower or inoperative positions merely rest against stops 59. In their upper or operative positions, however, they contact circuits 69, 79, and 89, respectively. Circuit 69 is connected to circuit 79 through a resistance 60 of 107 ohms, circuit 79 to circuit 89 through a resistance 70 of 28.75 ohms, and circuit 89 to circuit 40 through a resistance 80 of 24.25 ohms. The movable contact arms 68, 78, and 88 are all directly connected to each other and, through a circuit 109, to circuit 58. It is seen that no current flows through circuit 109 unless one of the three switches 61, 71, or 81 is in the upper or operative position. It will also be seen that substantially no current will flow through resistance 60 (even if switch 61 is closed) if switch 71 is closed, since the current will follow the path of least resistance. Likewise, substantially no current will flow through resistances 60 or 70 (even if switches 61 and/or 71 are closed) if switch 81 is closed.

Circuit 66 is connected to circuit 44 through a resistance 91 of 40.75 ohms. Likewise circuit 67 is connected through a resistance 92 of 40.75 ohms to circuit 45. Thus it is seen that actuation of switch 61 will cause the current to flow through circuit 44, resistance 91, circuit 66, arm 62, circuit 74, arm 72, circuit 84, and arm 82. Thence, part of the current will flow through circuit 58, arm 83, circuit 85, arm 73, circuit 75, arm 63, circuit 67, resistance 92, and circuit 45. In this arrangement, it will be observed that the circuit is broken if either switch 71 or 81 is in the upper or operative position. On the other hand, the circuit is not affected if switch 51 is in the upper or operative position. The remaining part of the current (starting with circuit 58 will flow through circuit 109, circuit 69, resistances 60, 70, and 80, and circuit 40, thus shunting across the galvanometer.

Circuit 76 is connected to circuit 66 through a resistance 93 of 48.25 ohms. Likewise circuit 77 is connected through a resistance 94 of 48.25 ohms to circuit 67. Thus it is seen that actuation of switch 71 will cause the current to flow through circuit 44, resistance 91, circuit 66, resistance 93, circuit 76, arm 72, circuit 84, and arm 82. Thence part of the current will flow through circuit 58, arm 83, circuit 85, arm 73, circuit 77, resistance 94, circuit 67, resistance 92, and circuit 45. In this arrangement, it will be observed that the current is broken if switch 81 is in the upper or operative position. On the other hand, the circuit is not affected if either switch 51 or 61 is in the upper or operative position. The remaining part of the current (starting with circuit 58) will flow through circuit 109, circuit 79, resistances 70 and 80, and circuit 40, thus shunting across the galvanometer.

Circuit 86 is connected to circuit 76 through a resistance 95 of 9.3 ohms. Likewise circuit 87 is connected through a resistance 96 of 9.3 ohms to circuit 77. Thus it is seen that actuation of switch 81 will cause the current to flow through circuit 44, resistance 91, circuit 66, resistance 93, circuit 76, resistance 95, circuit 86, arm 82, circuit 58, arm 83, circuit 87, resistance 96, circuit 77, resistance 94, circuit 67, resistance 92, and circuit 45. In this arrangement it will be observed that the circuit is not affected if any of the remaining switches are in the upper or operative position. The remaining part of the current (starting with circuit 58) will flow through circuit 109, circuit 89, resistance 80, and circuit 40, thus shunting across the galvanometer.

Referring now to Figure 3, the resistances in the galvanometer circuit are illustrated in a simplified fashion. Resistance 104 is the internal resistance of the galvanometer. Resistance 102 is none, 1, 2, or 3 of the resistances 91, 93, and 95. Resistance 101 is none, 1, 2, or 3 of the resistances 92, 94, and 96. Resistance 103 is none, 1, 2, or 3 of the resistances 60, 70, and 80. The remaining reference characters are the same as in Figure 2. The internal resistance 104 of the galvanometer in all switch arrangements is 53 ohms. The external series resistance 46 for all switch arrangements is 190 ohms. The external shunt resistance 47 for all switch arrangements is 165.5 ohms. When switch 51 is in operative position and switches 61, 71, and 81 in inoperative positions, resistances 101 and 102 are substantially zero, and resistance 103 substantially infinite. When switch 61 is in operative position and switches 71 and 81 in inoperative position, resistances 101 and 102 are 40.75 ohms each, and resistance 103 is 160 ohms. When switch 71 is in operative position and switch 81 in inoperative position, resistances 101 and 102 are 89 ohms each, and resistance 103 is 53 ohms. When switch 81 is in operative position, resistances 101 and 102 are 98.3 ohms each, and resistance 103 is 24.25 ohms. With these circuits, the effective values of G (in ohms) and F (Equation 5) are shown in the following table:

| Operative Switch | G | F | $\frac{R+G}{F}$ | |
|---|---|---|---|---|
| 51 | 98.45 | .4051 | 539 | $\frac{218.45}{.4051}$ |
| 61 | 115.19 | .2166 | 1,086 | $\frac{235.19}{.2166}$ |
| 71 | 130.32 | .08932 | 2,804 | $\frac{250.32}{.08932}$ |
| 81 | 119.89 | .04445 | 5,390 | $\frac{239.89}{.04445}$ |

It is seen that the factors $$\frac{R+G}{F}$$

for operation of switches 51, 61, 71, and 81 are in the respective proportions of approximately 1, 2, 5, and 10, since, with other factors constant, the strain S, required to produce a given galvanometer scale reading as a direct function of the current C, is twice as great for switch 61 as for switch 51, five times as great for switch 71 as for switch 51, and ten times as great for switch 81 as for switch 51.

Referring further to Figure 3 and the table above, it will be noted that the arrangement of resistances is such as to give a fairly small range of values for G, the total resistance of the galvanometer circuit. This arrangement, known as a "T pad" also is such as to give 70% critical damping, with a galvanometer having a sensitivity of 0.19 microamperes per millimeter and a period of one second.

The galvanometer scale is calibrated directly in microinches of strain per inch, with switch 51 in operation. With switches 61, 71, or 81 in operation, the gage reading is multiplied by 2, 5, or 10, respectively. The apparatus is calibrated at periodic intervals, principally to compensate for changes in internal resistance of the battery 16. Calibration is accomplished by means of the push-button switch 97. The upper deck 98 of this switch shunts a resistance 100 of 50,000 ohms across the terminals 21 and 22, thus unbalancing the bridge by 0.297 ohm. The lower deck 99 of the switch 97 connects circuit 45 directly with circuit 44, thus putting a load on the galvanometer equivalent to that accomplished by operation of the switch 51. With a gage factor of 20, this should give a galvanometer reading of 1237.5 microinches per inch. Proper reading is obtained by manipulation of the rheostat 39. For convenience in operation, all of the strain gages used at any one time should be of the same gage factor, so that the same setting of rheostat 39 may be used on all channels.

Referring now to switch 110 in the galvanometer circuit, it is normally kept in the position shown in the drawing by gravity or by means of a light spring. A solenoid 111 located adjacent switch 110 is normally deenergized, but when energized serves to open switch 110. Solenoid 111 is electrically connected at one terminal to a circuit 112 which leads through two resistants 113 and 114 to the two anodes or plates 123 and 124 respectively of two gas-filled electronic emission tubes 121 and 122 respectively, for purposes hereinafter described. At its other terminal solenoid 111 is connected to a push button reset switch 115, the latter being connected through upper deck 49 of main switch 50 to the positive terminal of a 145 volt battery 117. The negative terminal of the battery 117 is connected through a circuit 118 to the positive terminal of a 4.5 volt battery 140. Circuit 118 is also connected to a circuit 120, the main connection of the latter circuit 120 being to the cathodes 125 and 126 of the tubes 121 and 122 respectively. Thus it is seen that, if a current flows through either of the tubes 121 or 122, the solenoid 111 is actuated and the switch 110 is opened, so that no current flows through the galvanometer. The tubes 121 and 122 also contain operating grids 127 and 128 respectively, screen grids 129 and 130 respectively, and heaters 135 and 136 respectively.

Current does not flow between the cathodes 125 and 126 and the plates 123 and 124 unless the operating grids 127 and 128 are at a sufficiently high potential. These operating grids are connected through resistances 131 and 132 of 10,000 ohms each to circuits 40 and 33 respectively. In order to prevent wide fluctuations of potential between circuits 33 and 40 and cathodes 125 and 126, two resistances 107 and 108 of 10,000 ohms each are connected in series across circuits 33 and 40, and the connections between the two resistances joined to circuit 120 by means of circuit 106. With this arrangement, if there is a current output from the bridge through the galvanometer circuit, it makes no difference in which direction it flows, since either grid 127 or 128 will be excited to a positive potential. The excitation potential at which control grid 127 or 128 will cause a current to flow between cathode 125 or 126 and plate 123 or 124 is such that values below this will not cause excessive currents to flow through the galvanometer when switch 81 is operative. This excitation potential is controlled by means of screen grids 129 and 130, which are connected through two 5000 ohm potentiometers 133 and 134 respectively, circuit 142 and middle deck 48 of main switch 50 to the negative terminal of battery 140. As the positive terminal of battery 140 is connected through circuit 120 to the cathodes 125 and 126, and as there is also a shunt 141 around the tubes and between circuits 120 and 142 and including potentiometers 133 and 134, it is seen that the potential difference between screen grids 129 and 130 and cathodes 125 and 126 may be accurately controlled by means of potentiometers 133 and 134. After the apparatus is once adjusted, the setting of these potentiometers should not normally be changed.

The heaters 135 and 136 of the tubes 121 and 122 are connected across circuits 24 and 32, by means of circuits 137 and 138, to the battery 16. Circuit 137 is also connected to a switch 139 which is normally open, but which is actuated to the closed position by means of solenoid 111. A circuit 143, in which is located a warning light 144, connects the opposite pole of the switch 139 to circuit 138. Switches 110 and 139 conveniently form the two decks of a two-deck switch.

A light 116 connected around the battery 16 and lower deck 47 of switch 50 indicates when the apparatus is in operation.

Referring now to Figures 1 and 2, the apparatus is prepared for use by connecting a plurality of strain gages and compensating gages across the terminals 19 and 20 and 21 and 22 respectively of bridges 11, 12, 13, 14, 15, etc. All these gages should be of the same gage factor. Main switch 50 is then closed, lighting the light 116. If the warning light 144 goes on, it indicates trouble, and the system should be checked until the trouble is located. Since the galvanometer circuit is open when the warning light is on, it must be closed by deenergizing solenoid 111, which can be accomplished by opening the reset switch 115. If the warning light goes on again after the reset switch 115 is closed, it indicates that trouble is still present.

Channel selector switch 34 is then set at bridge position 11, and switch 81 closed. If the galvanometer 41 shows a reading in either direction, the bridge is balanced by manipulating the potentiometer 29 corresponding to that bridge position until the galvanometer reads 0. The adjustment may be made more accurate by opening switch 81 and closing switch 51. The same operation is then repeated for the remaining bridges 12, 13, 14, 15, etc. The apparatus is calibrated by setting the channel selector switch 34 at any balanced bridge position, closing the calibration switch 97, and manipulating rheostat 39 to secure the proper calibration adjustment.

After the bridges are balanced and calibrated, any desired loads are put on the strain gages. Strains are read by moving the channel selector switch to successive bridge positions, closing switch 51 (or 61, 71, or 81, according to the magnitude of the loads), and reading the strains directly in micro-inches per inch (multiplied by a factor of 2, 5, or 10 if switches 61, 71, or 81 are used).

The above discussion has been in connection with a specific form of the invention. It is obvious, however, that many changes may be made in this form without departing from the spirit of the invention. It is to be understood, therefore, that the invention is not to be limited except as defined in the appended claims.

I claim:

1. Apparatus for measuring strains by means of strain gage resistance elements, comprising a plurality of sets of terminals adapted for connection with a like plurality of such strain gage elements, each set of terminals being connected with a resistance network which when connected with a strain gage element constitutes a Wheatstone bridge, each network having bridge input and output connections, and each network having an independent manually adjustable resistance for balancing the bridge, a source of electrical energy and a circuit therefor including manually operable means for adjusting the current in the circuit, a galvanometer for indicating bridge output current value and a circuit therefor, means in the galvanometer circuit for varying the galvanometer range by predetermined increments while maintaining the resistance of the circuit approximately constant, and manually operable switch means for selectively connecting said source circuit with the input connections of any network and for simultaneously connecting the galvanometer circuit with the output connections of the selected network, whereby with the bridge input current adjusted by said current adjusting means into accordance with the galvanometer scale the bridges may be individually balanced by their respective adjustable resistances and thereafter quantitative measurements made of strains applied to the connected strain gage elements, and means, including a switch, connected between the source circuit and the galvanometer circuit, for unbalancing by a predetermined amount when said switch is closed any bridge that is selected by said manually operable switch means.

2. Apparatus for measuring strains by means of strain gage resistance elements and compensating resistance elements, comprising a plurality of sets of terminals, each set being adapted for connection with one such strain gage element and one such compensating element, each set of terminals being connected with a bridge resistance network which when connected with a strain gage element and a compensating element constitutes a Wheatstone bridge, and each bridge network having an independent manually adjustable resistance for balancing the bridge, a source of electrical energy and a circuit therefor including means for adjusting the current in the circuit, a galvanometer for indicating bridge output current value and a circuit therefor, the galvanometer circuit including a resistance network with switch means for varying the galvanometer range while maintaining the resistance of the galvanometer circuit approximately constant, and manually operable switch means for selectively connecting said source circuit with the input connections of any bridge network and for simultaneously connecting the galvanometer circuit with the output connections of the selected bridge network, whereby with the bridge input current adjusted by said current adjusting means into accordance with the galvanometer scale the bridges may be individually balanced by their respective adjustable resistance and thereafter direct quantitative measurements made of strains applied to the connected strain gage elements, and means, including a switch, connected between the source circuit and the galvanometer circuit, for unbalancing by a predetermined amount when said switch is closed any bridge that is selected by said manually operable switch means.

3. Apparatus for measuring strains by means of strain gage elements of substantially equal resistivity, comprising a plurality of sets of terminals adapted for connection with a like plurality of such strain gage elements, each set of terminals being connected with a resistance network which when connected with the strain gage element constitutes a Wheatstone bridge, all of said networks having substantially equivalent resistance values, and each network having an independent manually adjustable resistance for balancing the bridge and input and output connections, a source of energy circuit including manually adjustable means for varying the current, a galvanometer for indicating bridge output current value, manually operable switch means for selectively connecting said source circuit with the input connections of any network and for simultaneously connecting the galvanometer with the output connections of the selected network, and means, including a switch, connected between the source circuit and the galvanometer circuit, for unbalancing by a predetermined amount when said switch is closed any bridge that is selected by said manually operable switch means.

4. Apparatus for measuring strains by means of strain gage elements of substantially equal resistivity and compensating elements of substantially equal resistivity, comprising a plurality of sets of terminals each adapted for connection with one such strain gage element and one such compensating element, each set of terminals being connected with a resistance network which when said elements are connected therewith constitute a Wheatstone bridge, all of said networks having substantially equivalent resistance values, and each network having an independent manually adjustable resistance for balancing the bridge and input and output connections, a source of energy circuit including manually adjustable means for varying the current, a galvanometer for indicating bridge output current value, manually operable switch means for selectively connecting said source circuit with the input connections of any network and for simultaneously connecting the galvanometer with the output connections of the selected network, and means, including a switch, connected between the source circuit and the galvanometer circuit, for unbalancing by a predetermined amount when said switch is closed any bridge that is selected by said manually operable switch means.

5. Apparatus for measuring strains by means of strain gage resistance elements, comprising a plurality of sets of terminals adapted for connection with a like plurality of such strain gage elements, each set of terminals being connected with a resistance network which when connected with a strain gage element constitutes a Wheatstone bridge, each network having bridge input and output connections, all of said networks having substantially the same resistance values and each network having an independent manually adjustable resistance for balancing the bridge, a source of electrical energy and a circuit therefor including manually operable means for adjusting the current in the circuit, a galvanometer for indicating bridge output current value and a circuit therefor, manually operable switch means for selectively connecting said source circuit with the input connection of any network and for simultaneously connecting the galvanometer circuit with the output connections of the selected network, and a shunt circuit, including a resistance and a switch, across the source circuit and the galvanometer circuit, for unbalancing any selected bridge by a predetermined quantity whereby the source circuit current may be adjusted into accordance with the galvanometer scale.

6. Apparatus for measuring strains by means of strain gage resistance elements and compensating resistance elements, comprising a plurality of sets of terminals, each set being adapted for connection with one such strain gage element and one such compensating element, each set of terminals being connected with a bridge resistance network which when connected with a strain gage element and compensating element constitutes a Wheatstone bridge, each network having bridge input and output connections, all of said networks having substantially the same resistance values and each network having an independent manually adjustable resistance for balancing the bridge, a source of electrical energy and a circuit therefor including manually operable means for adjusting the current in the circuit, a galvanometer for indicating bridge output current value and a circuit therefor, manually operable switch means for selectively connecting said source circuit with the input connection of any network and for simultaneously connecting the galvanometer circuit with the output connections of the selected network, and a shunt circuit, including a resistance and a switch, across the source circuit and the galvanometer circuit, for unbalancing any selected bridge by a predetermined quantity whereby the source circuit current may be adjusted into accordance with the galvanometer scale.

7. Apparatus for measuring strains by means of strain gage elements of substantially equal resistivity, comprising a plurality of Wheatstone bridges of substantially equal resistance value with each bridge having one such gage element in one arm thereof, each bridge having an independent manually adjustable resistance for balancing the bridge, means for providing a source of electrical potential of predetermined constant value across opposed bridge arm junctions, a galvanometer for indicating bridge output current value and a circuit therefor, manually operable switch means for selectively connecting said galvanometer circuit to any selected one of said bridges across the remaining arm junctions thereof, said galvanometer circuit having a shunt thereacross of variable resistance value and having on each side of said shunt resistances of variable value, manually operable means for increasing the resistance of said shunt by predetermined increments and for simultaneously decreasing the resistance of each of said resistances of variable value by predetermined increments, whereby the range of the galvanometer may be varied by predetermined increments while maintaining the resistance value of the galvanometer circuit approximately constant, and means, including a switch, connected between the source circuit and the galvanometer circuit, for unbalancing by a predetermined amount when said switch is closed any bridge that is selected by said manually operable switch means.

8. In an instrument for measuring strains by means of strain gage resistance elements, a casing and means supported thereby comprising a galvanometer and circuit therefor, a manually operable selector switch, a battery and circuit therefor including adjustable means for regulating the current in the circuit, a plurality of sets of terminals adapted for connection with a like plurality of external strain gage resistance elements which may be attached to a structure to be tested, a resistance network connected with each set of terminals and which when such strain gage element is connected constitutes a Wheatstone bridge, all of said networks having substantially the same resistance values and each network having an independent manually adjustable resistance for balancing the bridge, said selector switch being arranged to connect the battery circuit across the current input bridge junctions of any selected one of said networks and to simultaneously connect the galvanometer circuit across the current output bridge junctions of the selected network whereby the galvanometer may be employed to indicate balance of any bridge and change of resistance of any of said strain gage resistance elements, and a resistance and switch means for connecting the same across the battery circuit and the galvanometer circuit whereby the means for adjusting the battery circuit current may be operated to calibrate the galvanometer in any selected position of said selector switch.

LOUIS D. STATHAM.

REFERENCES CITED

The following references are of record in the file of this patent:

UNITED STATES PATENTS

| Number | Name | Date |
|---|---|---|
| 1,460,530 | Brown et al. | July 3, 1923 |
| 1,493,586 | Wood | May 13, 1924 |
| 1,877,739 | Schneider | Sept. 13, 1932 |
| 2,047,343 | Ward | July 14, 1936 |
| 2,135,587 | Lovelady | Nov. 8, 1938 |
| 2,218,629 | Swart | Oct. 22, 1940 |
| 2,246,575 | Coleman | June 24, 1941 |
| 2,252,464 | Kearns, Jr. et al. | Aug. 12, 1941 |
| 2,360,886 | Osterberg | Oct. 24, 1944 |
| 2,389,615 | Eder | Nov. 27, 1945 |

FOREIGN PATENTS

| Number | Country | Date |
|---|---|---|
| 406,360 | Great Britain | Feb. 26, 1934 |

OTHER REFERENCES

Publication entitled "Strain Gages" in Electronics, Dec. 1943, pages 106–11; 192–195.